US005256925A

United States Patent [19]

Cutsforth

[11] Patent Number: 5,256,925

[45] Date of Patent: Oct. 26, 1993

[54] BRUSH HOLDER WITH IMPROVED SPRING CLIP ARRANGEMENT

[76] Inventor: David L. Cutsforth, Rte. 1, Box 501, Grand Rapids, Minn. 55721

[21] Appl. No.: 858,337

[22] Filed: Mar. 24, 1992

[51] Int. Cl.[5] ...................... H01R 39/40; H02K 13/00

[52] U.S. Cl. .................................... 310/247; 310/242

[58] Field of Search ............... 310/247, 239, 242, 245, 310/249

[56] References Cited

U.S. PATENT DOCUMENTS

| | | | |
|---|---|---|---|
| 3,634,710 | 1/1972 | Woda | 310/239 |
| 4,166,227 | 8/1979 | Guglielmo | 310/242 |
| 4,409,508 | 10/1983 | Ooki et al. | 310/239 |
| 5,043,619 | 8/1991 | Kartman, Jr. | 310/242 |

FOREIGN PATENT DOCUMENTS

| | | | |
|---|---|---|---|
| 1494078 | 7/1989 | U.S.S.R. | 310/239 |

*Primary Examiner*—Steven L. Stephan
*Assistant Examiner*—Ed To
*Attorney, Agent, or Firm*—Jerold M. Forsberg

[57] ABSTRACT

A brush holder for an electrical brush includes a brush holder body and an improved spring clip arrangement. Included in the brush holder body is a spring clip pocket and a brush pocket. The brush pocket slidably guides an electrical brush therein and a spring clip assembly, including a generally V-shaped spring clip with a shoulder stop, is sized to be received in the spring clip pocket. The shoulder stop on the spring clip engages a stop in the brush holder body when the spring clip is seated in the spring clip pocket. The spring clip assembly includes a constant force spring for applying a constant force to an electrical brush in the brush pocket when the spring clip is in the seated position. A latch pin engages a latch aperture in one leg of the spring clip, when the spring clip is seated, and a cross pin removable from the top of the brush holder body, controls separation of the spring clip from the brush holder body when the spring clip is retracted from the spring clip pocket. The cross pin is also positioned to permit the spring clip to be pivoted out of the way when retracted so that a new brush can be installed.

16 Claims, 2 Drawing Sheets

BRUSH HOLDER WITH IMPROVED SPRING CLIP ARRANGEMENT

BACKGROUND OF THE INVENTION

The present invention relates generally to a brush holder for an electrical brush and more particularly to a brush holder with an improved spring clip arrangement.

Electrical brushes are used with various types and sizes of machinery, e.g., generators and electric motors, for collecting current from moving components. In some instances electrical brushes are employed to simply act as a pick up for the removal of static electricity which has a tendency to accumulate in moving components supported by bushings and bearings. In order to avoid integrating a brush holder into the design of an unrelated component in a piece of machinery, separate brush holders have been developed and are generally known. The primary purpose of a brush holder is to maintain contact between an electrical brush held thereby and a moving component. Replacement of brushes becomes necessary due to wear and damage, and experience has shown that a substantial amount of time can be lost because of the manner in which brushes are secured in a brush holder. As brush holder design evolved the holders changed to accommodate rapid changing of the brushes. Accordingly, the concept of designing a brush holder to accommodate changing of the brushes is also known.

Most electrical brushes are made of a carbon and graphite composition and the amount of force holding the brush against the surface of a moving component will determine the rate of brush wear as well as the rate of wear caused in the surface of the moving component. Accordingly, brush holders must accommodate replacement of the brushes in addition to providing for the application of an appropriate amount of force for biasing the electrical brush into contact with the moving component.

One commercially available approach to the above noted compound problem includes a recoil constant force spring for biasing an electrical brush toward a moving component mounted on a spring clip having multiple bends for latching the spring clip assembly in an in use position in a brush holder body. This brush holder has sufficient material to accommodate a strong spring clip assembly for biasing as well as for facilitating the changing of the brushes when the brushes and holders are of a relatively large size. However, this approach has problems with the strength and durability of spring clips which are proportionately smaller in size when brush holders of this type are relatively small. Generally stated, these spring clips have a lack of consistency in latching and remaining latched relative to the brush holder body in the in use position. This inconsistency can result in the spring clip assembly sliding or being pushed to far into the brush holder pocket to a point where it can engage and damage the moving component.

It has been found that the failure of the prior art spring clip arrangement to be positively positioned is not only related to the spring clip being weakened by being diminutive in size or because the spring clip may have become worn or damaged, but is also due to the overall faulty configuration of the spring clip arrangement. Accordingly, the most significant problem in the prior art devices was recognized as being a faulty design which resulted in the failure of the devices to positively position a spring clip in a spring clip pocket and thereby prevent the spring clip from engaging a moving component while maintaining a constant force on a brush carried in a brush holder pocket. Searching for answers to these problems resulted in the instant invention, which not only answered the above noted problems but which also provided additional improvements not previously realized.

There is a market, then, for a brush holder design, which is effective for large and small brush holders utilizing a constant force spring on a spring clip to apply constant pressure to an electrical brush guided in a brush holder pocket in the brush holder body, and which is capable of permitting the rapid interchanging of electrical brushes, especially if such a device is simple in construction and easy to use.

SUMMARY OF THE INVENTION

It is a primary purpose and principle object of the present invention to provide a brush holder with an improved spring clip arrangement for supporting an electrical brush which is effective, simple to use, and economical to manufacture.

The present invention involves a brush holder with a spring clip arrangement which is effective for large and small brush holders. The spring clip arrangement includes a generally V-shaped spring clip carrying a constant force spring for biasing an electrical brush which is positioned and guided in a brush holder pocket in a brush holder body. One significant improvement is that the generally V-shaped spring clip includes a shoulder stop which stops the spring clip in a seated position in a spring clip pocket in the brush holder body to when the shoulder stop engages a stop formed in the holder body. Another improvement is that the generally V-shaped spring clip is held in the seated position by a latch pin engaging a latch aperture in one leg of the spring clip. A significant improvement is that the generally V-shaped spring clip is prevented from being separated from the brush holder body by an easily removable cross pin which, when the spring clip needs to be changed can be removed from the top of the holder body in the same general direction in which the spring clip is retracted from the holder body. It is the simplicity of the design, including the fact that the generally V-shaped spring clip has greater strength, which is the principal advantage of the instant invention. This advantage is particularly apparent when a relatively small brush holder is constructed in accordance with the principles of the instant invention.

Accordingly, it is also an object of the instant invention to provide a brush holder arrangement which includes a spring clip assembly that is positively stopped in a seated position in a brush holder body.

Another object of this invention to provide a brush holder with a durable generally V-shaped spring clip permitting the rapid changing of worn and defective electrical brushes in all sizes of brush holders.

It is a further object of this invention to provide a brush holder utilizing a generally V-shaped spring clip with a removable cross pin facilitating replacement of the spring clip and controlling retraction and pivoting of the spring clip relative to the brush holder body.

These and other objects and advantages of the present invention will be apparent and understood from the following detailed description when taken in conjunction with the accompanying drawings.

DETAILED DESCRIPTION OF THE INVENTION

Figure 1:
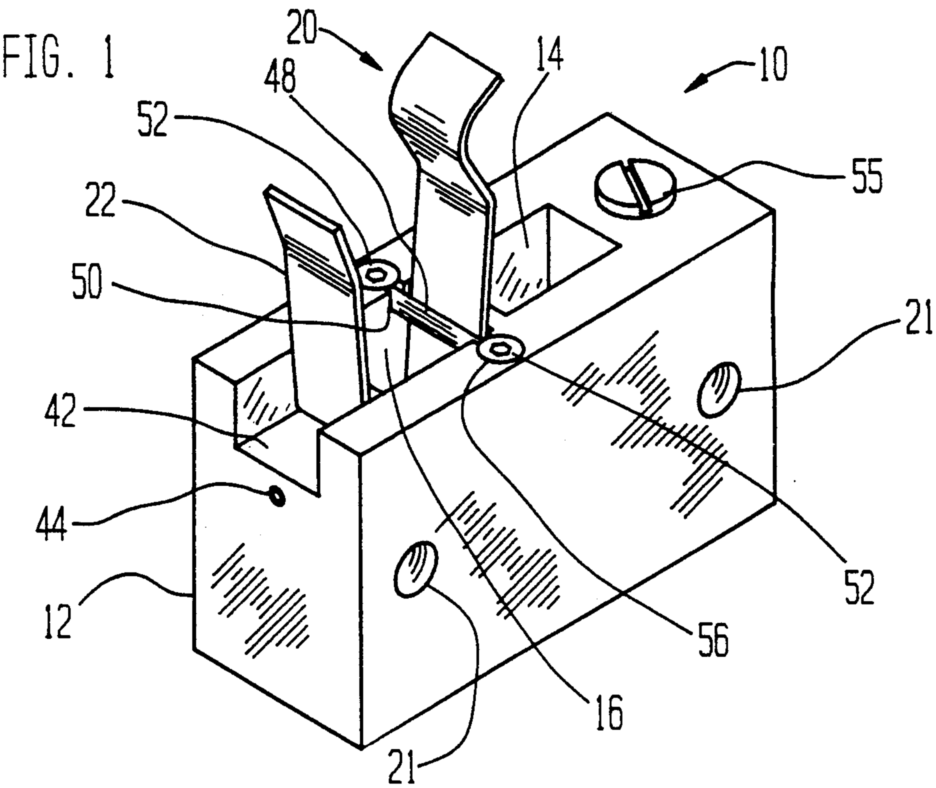
FIG. 1 is a perspective view of a brush holder according to the present invention.
Figure 2:
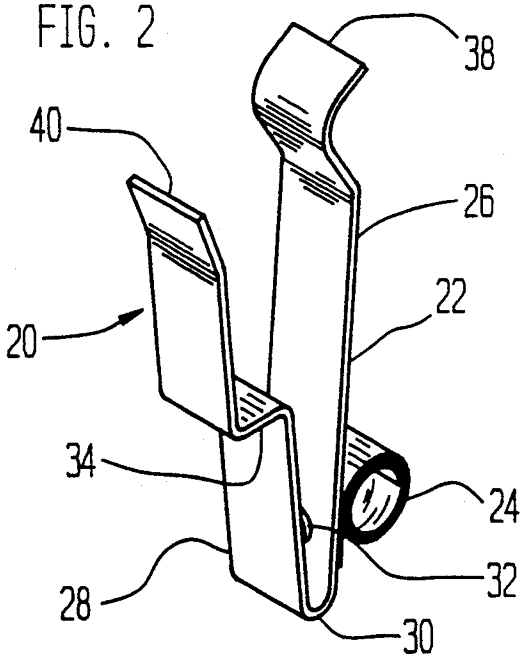
FIG. 2 is a perspective view of a spring clip assembly used with the brush holder seen in FIG. 1.
Figure 3:
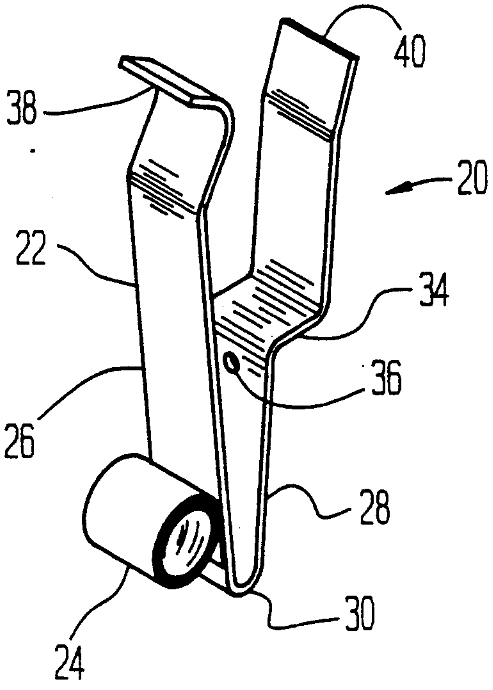
FIG. 3 is a perspective view of the spring clip assembly of FIG. 2 seen from another angle.
Figure 4:
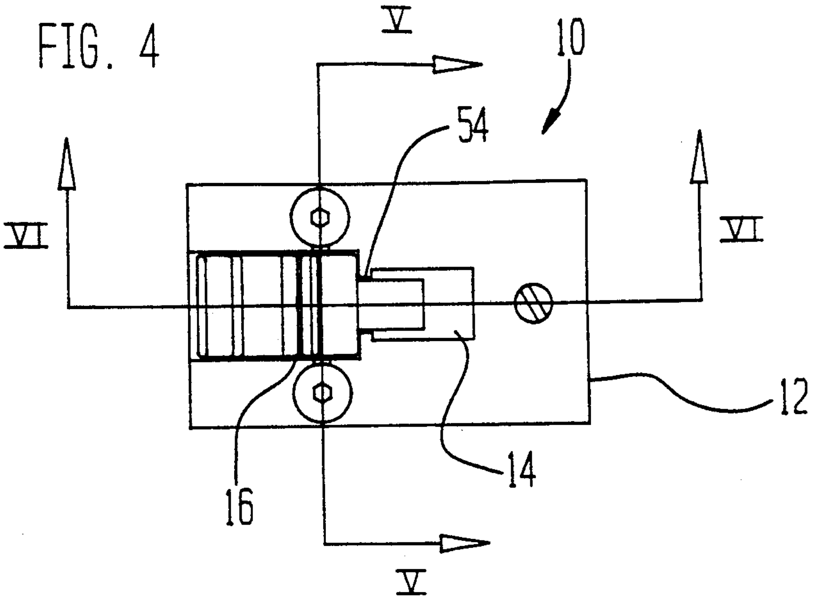
FIG. 4 is a top plan view of the brush holder, including the spring clip, as seen in FIG. 1.

A brush holder for an electrical brush, constructed in accordance with the principles of this invention, is described hereinbelow, with reference to the accompanying drawing, wherein like reference numerals are used throughout the various views to designate similar elements or components.

Referring now to FIG. 1, there is shown a brush holder 10 constructed according to the instant invention. Brush holder 10 includes a brush holder body 12 which in turn includes a brush pocket 14 and a spring clip pocket 16. Brush pocket 14 is sized to slidably receive an electrical brush 18 therein and an improved spring clip assembly 20 is sized to be seated in spring clip pocket 16. The brush holder 10 can be secured to supporting structure by any suitable means and bores 21 for receiving attaching bolts (not shown) are for this purpose.

Figure 6:
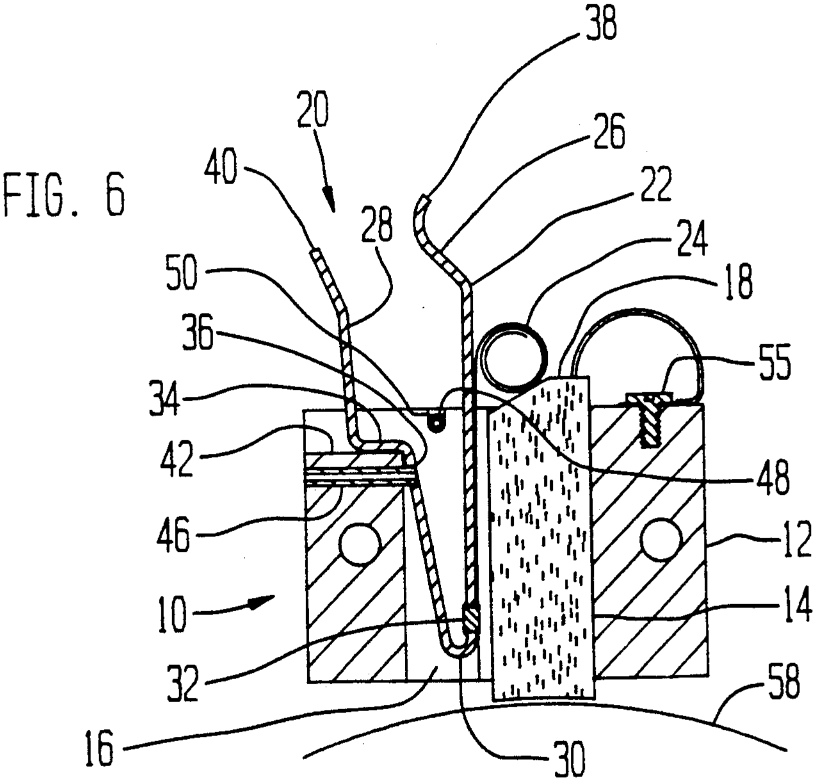
FIG. 6 is a cross sectional view of the brush holder, including the brush holder body, spring clip assembly, and an electrical brush disposed in the brush pocket, taken along line VI—VI in FIG. 4.

Spring clip assembly 20 includes a generally V-shaped spring clip 22 having a recoil constant force spring 24, i.e., a negator spring, attached thereto for engaging and biasing electrical brush 18 relative to brush holder body 12 when the spring clip assembly is seated in spring clip pocket 16. Spring clip 22 includes a first leg 26 and a second leg 28 joined to one another at an apex 30. Constant force spring 24 is attached to first leg 26 by a rivet 32 generally in the vicinity of the apex and is arranged to uncoil in the direction of a free end of first leg 26. Second leg 28 includes a shoulder 34 generally midway along the length thereof and a latch aperture 36 disposed proximate the shoulder 34 between the shoulder 34 and the apex 30. As best seen in FIG. 6, shoulder 34 forms an offset in the second leg 28 and extends generally perpendicular to an offset portion of the leg. The length of the shoulder, when added to the thickness of the material of which the spring clip 22 is made, is sufficient to exceed the width of spring clip pocket 16 for reasons which will be discussed later. Free ends 38,40, respectively, of the first and second legs 26,28 include bends which facilitate gripping by a workman's fingers such that the generally V-shaped spring clip 22 can be squeezed together until the first and second legs, in the vicinity of the apex, are juxtaposed for reasons which will also become apparent from the discussion which follows.

Brush holder body 12 includes a stop 42 against which shoulder 34 engages when the spring clip assembly 20 is seated in spring clip pocket 16. A bore 44 is positioned just below stop 42 and a rolled expansion pin 46, operable as a latch pin, is inserted therein and protrudes into the spring clip pocket 16 a distance sufficient to engage latch aperture 36 when the spring clip assembly 20 is seated and released in the spring clip pocket. The outward bias away from one another of the first and second legs 26, 28 of the generally V-shaped spring clip 22 causes a positive engagement of the latch pin 46 with latch aperture 36 when the spring clip is seated in the brush pocket.

Figure 5:
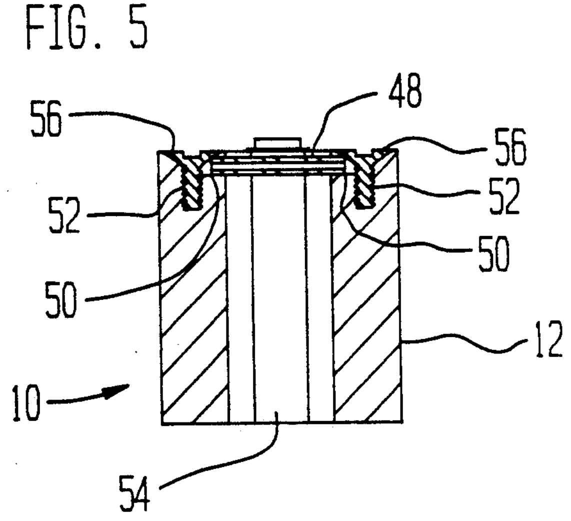
FIG. 5 is a cross sectional view of the brush holder body, without the spring clip, taken along line V—V of FIG. 4.

A cross pin 48, secured in the holder body 12, controls separation of the spring clip assembly 20 from the brush holder body 12 and is positioned to permit pivoting of the spring clip relative to the brush holder body when the spring clip assembly 20 is retracted from the spring clip pocket 16. Cross pin 48 can be fixed relative to the brush holder body by various means and preferably is removably secured in notches 50 by threaded fasteners 52. As best seen in FIG. 5, cross pin 48 can be a rolled expansion pin which rests in notches 50 and is held in place by the heads 56 of the threaded fasteners 52.

Referring again to FIG. 5, spring clip pocket 16 communicates with brush holder pocket 14 by way of a slot 54 which is wide enough to permit the constant force spring 24 to move relative thereto without binding. As best understood by referring to FIG. 6, as electrical brush 18 wears and becomes shorter the constant force spring 24 recoils while maintaining a constant force on the back end of the electrical brush. As the constant force spring recoils it passes into slot 54 without binding and, accordingly, without changing the amount of force applied to the electrical brush. In order to ensure a positive electrical connection between holder body 12 and electrical brush 18, a threaded fastener 55 is provided for the attachment of a connector cable extending from the electrical brush to the holder body.

In use, spring clip assembly 20 is retracted from spring clip pocket 16 and pivoted about cross pin 48 to a position wherein the constant force spring 24 is out of alignment with brush pocket 14. An electrical brush 18 can then be inserted in brush pocket 14 and spring clip assembly 20 is pivoted about cross pin 48 and seated in the spring clip pocket 16 with shoulder 34 engaging stop 42 and latch pin 46 engaging latch aperture 36 to fix the spring clip assembly 20 relative to the brush holder body 12. Constant force spring 24 engages the back end of the electrical brush and uncoils as spring clip 22 is seated thereby biasing the electrical brush 18 relative to the brush holder body 12 such that the electrical brush 18 engages a rotating component 58, e.g., a commutator, with a constant amount of force. As the electrical brush 18 wears and becomes shorter the constant force spring 24 shortens by recoiling. The coiled remainder of the constant force spring engages the back end of the remaining portion of the electrical brush without binding in slot 54. It should be readily apparent that an electrical brush supported by the brush holder can be quickly and easily changed by simply gripping the distal ends 38, 40 of the legs 26, 28 of the generally V-shaped spring clip 22 and squeezing the legs together to release the latch pin 46 from the latch aperture 36. The spring clip assembly 20 can then be retracted from the spring clip pocket 16, pivoted relative to the brush holder body 12 such that the constant force spring is out of engagement with the electrical brush and out of alignment with the brush pocket thereby permitting the replacement of an electrical brush disposed therein. It should also be apparent that the spring clip assembly 20 can not be inserted farther into the spring clip pocket than the seated position because of shoulder 34 engaging stop 42. The offset created by shoulder 34 has sufficient length to cause the spring clip 22 to have a dimension greater than the width of spring clip pocket 16, when squeezed together, thereby positively seating said spring clip assembly and preventing insertion or slippage of the spring clip 22 into the spring clip pocket 16 beyond the seated position. It should also be apparent that the spring clip assembly 20 can be easily changed by the removal of threaded fasteners 52 and cross pin 48. The fact that the cross pin 48 can be removed from the top of the brush holder body 12, in the same general direction that the spring clip assembly is retracted, simplifies the procedure and obviates the need to remove the entire brush holder 10 for repair.

The device disclosed herein can be formed from any of a number of different suitable materials and by any of a number of different processes and, in its preferred form, the brush holder body is made of brass and the generally V-shaped spring clip is made of stainless steel.

While this invention has been described with a certain degree if particularity, it should be understood that other forms of brush holders with improved spring clip arrangements are contemplated by the present invention and it is manifest that many changes may be made in the details of construction and in the arrangement of components without departing from the spirit and scope of the disclosure. It is understood that the invention is not limited to the embodiments set forth herein for purposes of exemplification, but is limited only by the scope of the attached claims, including the full range of equivalency to which each element is entitled.

I claim:

1. A brush holder for use with electrical brushes comprising a brush holder body and a spring clip assembly, said brush holder body including a brush pocket sized to slidably guide an electrical brush disposed therein, a spring clip pocket for receiving said sprint clip assembly therein, and stop means for positively stopping said spring clip assembly in a seated position in said spring clip pocket, said spring clip assembly including shoulder means formed by an offset for engaging said stop means when said spring clip assembly reaches the seated position, said offset creating a dimension for said spring clip assembly to thereby prevent insertion of said spring clip assembly into said spring clip pocket beyond said seated position, means for releasably securing said spring clip assembly relative to said brush holder body when said spring clip assembly is in the seated position, and biasing means carried by said spring clip assembly for engaging and biasing an electrical brush disposed in said brush pocket relative to said brush holder body when said spring clip assembly is in the seated position.

2. A brush holder as set forth in claim 1 wherein said spring clip assembly includes a generally V-shaped spring clip having first and second legs joined at an apex and said biasing means is carried by said first leg and said shoulder means is disposed in said second leg.

3. A brush holder as set forth in claim 2 including a slot interconnecting at least a portion of said brush pocket and a portion of said spring clip pocket, said biasing means being disposed on an outside of said first leg and sized to move relative to said slot without binding.

4. A brush holder as set forth in claim 3 wherein said biasing means is a constant force spring and one end of the constant force spring is riveted to an outside of the first leg generally in the vicinity of where the first and second legs of the generally V-shaped spring clip are joined at the apex.

5. A brush holder as set forth in claim 4 wherein said constant force spring engages an end of an electrical brush disposed in said brush holder pocket with a coiled remainder of said spring.

6. A brush holder as set forth in claim 4 wherein said shoulder means formed in the second leg extends generally outwardly of the generally V-shaped spring clip.

7. A brush holder as set forth in claim 2 wherein said means for releasably securing includes a latch pin for securing said spring clip assembly relative to said brush holder body when said spring clip assembly is in the seated position by said latch pin engaging a latch aperture in one of said legs of said generally V-shaped spring clip.

8. A brush holder as set forth in claim 7 wherein said latch aperture is disposed in said second leg proximate said shoulder means and between said shoulder means and said apex and said latch pin is a rolled pin inserted in a bore in the brush holder body and disposed so as to be in alignment with said latch aperture when said spring clip assembly is in the seated position.

9. A brush holder as set forth in claim 7 including means disposed in said brush holder body for controlling separation and pivoting of said spring clip assembly relative to said brush holder body.

10. A brush holder as set forth in claim 9 wherein said means for controlling includes a removable pin disposed to extend across said spring clip pocket in a position preventing separation of said spring clip assembly from the brush holder body while permitting retraction of said spring clip assembly from the spring clip pocket and pivoting of said spring clip assembly relative to the brush holder body, said removable pin removably secured in notches in the brush holder body by a head of a threaded fastener.

11. A brush holder for use with electrical brushes comprising a brush holder body and a spring clip assembly, said brush holder body including a brush pocket sized to slidably guide an electrical brush disposed therein, a spring clip pocket for receiving said sprint clip assembly therein, and stop means for positively stopping said spring clip assembly in a seated position in said spring clip pocket, said spring clip assembly including a generally V-shaped spring clip having first and second legs joined at an apex and shoulder means formed by an offset in one of said first and second legs for engaging said stop means when said spring clip reaches the seated position, said offset creating a dimension for said spring clip assembly to thereby prevent insertion of said spring clip assembly beyond said seated position, means disposed in a position crossing said spring clip pocket for controlling separation of said spring clip assembly from the brush holder body while permitting retraction of said spring clip assembly from the spring clip pocket and pivoting of said spring clip assembly relative to the brush holder body, means for releasably securing said spring clip assembly relative to said brush holder body when said spring clip assembly is in the seated position, and biasing means carried by said spring clip assembly for engaging and biasing an electrical brush disposed in said brush pocket relative to said brush holder body.

12. A brush holder as set forth in claim 11 wherein said means for controlling includes a removable pin removably secured in notches in the brush holder body by at least one head of at least one threaded fastener.

13. A brush holder as set forth in claim 12 wherein said removable pin is disposed to extend across said spring clip pocket in a position permitting pivoting of said spring clip relative to the brush holder body wherein said constant force spring can be disengaged from said electrical brush thereby facilitating unobstructed replacement of the electrical brush in said brush pocket.

14. A brush holder as set forth in claim 13 wherein said means for releasably securing includes a latch pin for securing said spring clip relative to said brush holder body when said spring clip is in the seated position by said latch pin engaging a latch aperture in said spring clip.

15. A brush holder as set forth in claim 14 wherein said generally V-shaped spring clip includes bends at distal ends of said first and second legs to facilitate gripping and squeezing of said legs together to release said spring clip from said latch pin thereby permitting retraction of the spring clip from the spring clip pocket.

16. A brush holder as set forth in claim 15 including a grounding fastener on said brush holder body for attachment of a lead from said electrical brush.

* * * * *